United States Patent
Chellam et al.

(10) Patent No.: US 8,028,203 B2
(45) Date of Patent: Sep. 27, 2011

(54) EXCEPTION VIEW WITH CONTEXT

(75) Inventors: Sudhakar V. Chellam, Apex, NC (US); Rosalind Radcliffe, Durham, NC (US); Robert T. Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1500 days.

(21) Appl. No.: 11/424,890

(22) Filed: Jun. 19, 2006

(65) Prior Publication Data

US 2007/0294700 A1    Dec. 20, 2007

(51) Int. Cl.
G06F 11/00 (2006.01)
(52) U.S. Cl. .......................................................... 714/57
(58) Field of Classification Search ................... 714/48, 714/57
See application file for complete search history.

(56) References Cited

U.S. PATENT DOCUMENTS

| | | | |
|---|---|---|---|
| 4,322,791 A * | 3/1982 | Ishii ................................... | 714/2 |
| 5,369,756 A * | 11/1994 | Imura et al. ....................... | 714/26 |
| 5,504,863 A * | 4/1996 | Yoshida ........................... | 714/47 |
| 7,171,593 B1 * | 1/2007 | Whittaker et al. ................ | 714/57 |
| 7,350,111 B2 * | 3/2008 | Chen ................................. | 714/36 |
| 7,685,477 B2 * | 3/2010 | Sauber et al. ..................... | 714/57 |
| 7,689,579 B2 * | 3/2010 | DeMesa et al. ......... | 707/999.102 |
| 2003/0112269 A1 | 6/2003 | Lentz et al. .................... | 345/738 |
| 2005/0104880 A1 | 5/2005 | Kawahara et al. ............ | 345/419 |
| 2007/0168763 A1 * | 7/2007 | Sauber et al. .................... | 714/57 |

FOREIGN PATENT DOCUMENTS

WO    WO 2005/089240    9/2005

* cited by examiner

*Primary Examiner* — Amine Riad
(74) *Attorney, Agent, or Firm* — Hamilton & Terrile, LLP; Stephen A. Terrile

(57) ABSTRACT

A method, apparatus and computer-usable medium for the graphical presentation of the contextual relationship between a reported exception and its related resources and/or contributing factors. An exception view is presented to display an abnormally operating resource and the operational state of its related resources and/or contributing factors. Contextually related processes and resources are graphically depicted in one or more hierarchy trees, topologically-oriented views, or other depictions, with the operational health or condition of each resource indicated. Fault determination and resolution of the reported exception and its related processes and resources can then be facilitated.

14 Claims, 14 Drawing Sheets

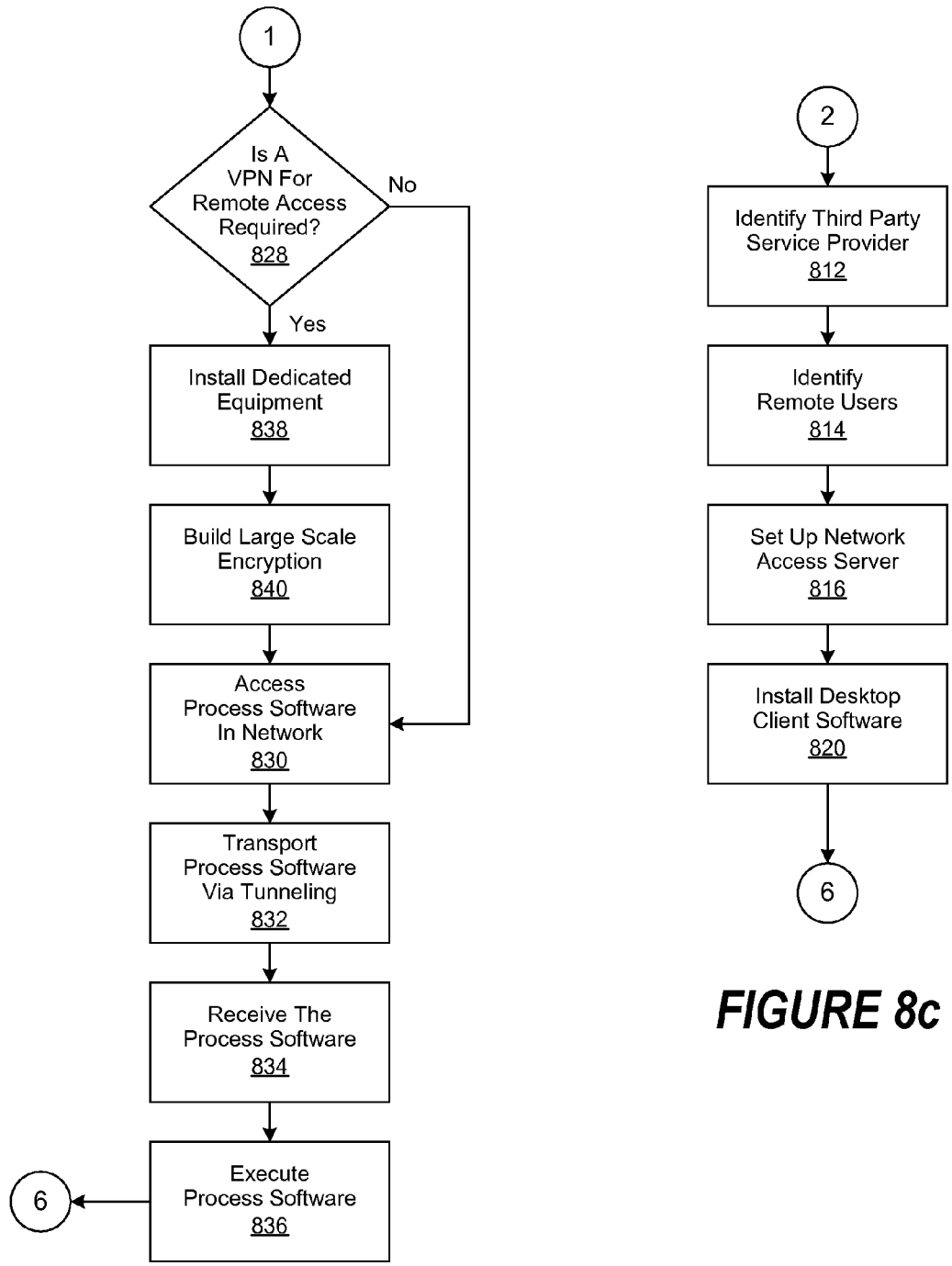

EXCEPTION VIEW WITH CONTEXT

BACKGROUND OF THE INVENTION

1. Field of the Invention

The present invention relates in general to the field of computers and similar technologies, and in particular to software utilized in this field. Still more particularly, the present invention relates to the graphical presentation of system exceptions.

2. Description of the Related Art

The growing demand for information automation continues to drive the development of progressively more sophisticated information processing environments. The management of the hardware systems and software applications that comprise these environments has become increasingly complex due to the quantity and diversity of the resources that offer the capabilities they provide. In response, known system management approaches have been implemented to monitor system availability and performance, track events as they occur, and report exceptions to normal operation. However, these approaches typically produce large amounts of system operating detail, much of which may not be immediately relevant to exception handling, often requiring the use of information filters, graphical views and facilitated navigation to allow system administrators to reduce information overload.

For example, in some known approaches, events can be filtered to display only if a resource's status reaches a predetermined threshold level (e.g., display if operating health is less than 80%). In others, configuration parameters can be set to indicate a resource's operating state within a topology-oriented view if the resource's condition becomes abnormal (e.g., red for critical, amber for marginal, etc.). While these approaches limit the display to only those resources or events that fall within predetermined alert parameters, related resources or events contributing to the alert are often not visible without accessing additional levels of detail. Identifying the location of this additional information can prove challenging, possibly requiring the opening and closing of additional graphical windows, drilling down multiple levels of a hierarchy tree, or other time consuming and tedious efforts.

Even when the relevant information is found, additional delays can be encountered, as it is often difficult to see the contextual relationship between contributing factors and the reported exception. As the number of resources being managed grows in number and heterogeneity, the presentation of these relationships becomes more difficult. Showing too much information can be confusing and mask a problem. Showing too little information can provide insufficient means to resolve a problem. Showing adequate information but not its contextual relationship can delay resolution of a problem. In view of the foregoing, there is a need for an improved method of presenting the contextual relationship between a reported exception and its contributing factors.

SUMMARY OF THE INVENTION

The present invention includes, but is not limited to, a method, apparatus and computer-usable medium for the graphical presentation of the contextual relationship between a reported exception and its related resources and/or contributing factors. In different embodiments of the invention, an exception view is presented to display an abnormally operating resource and the operational state of its related resources and/or contributing factors, which may be operating properly, sub-optimally, abnormally, or in a failed state.

For example, a process may be indicated as being in a critical state (e.g., displayed in red) as a result of a proportionately number of contributing sub-processes operating in a marginal state (e.g., displayed in amber). As another example, a contributing peer process that has failed can result in an exception alert for a downstream process. As yet another example, contributing sub-processes may be operating properly, but due to network connectivity problems, their operation is being erroneously reported to a parent process, resulting in an exception event being reported.

It will be apparent to those of skill in the art that in these and in other examples, fault determination and resolution can be facilitated by presenting the contextual relationship between the reported exception and its related processes and resources. The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIGS. 8a-c show a flow-chart of steps taken to deploy in a Virtual Private Network (VPN) software that is capable of executing the steps shown and described in FIG. 3;

DETAILED DESCRIPTION

Figure 3:
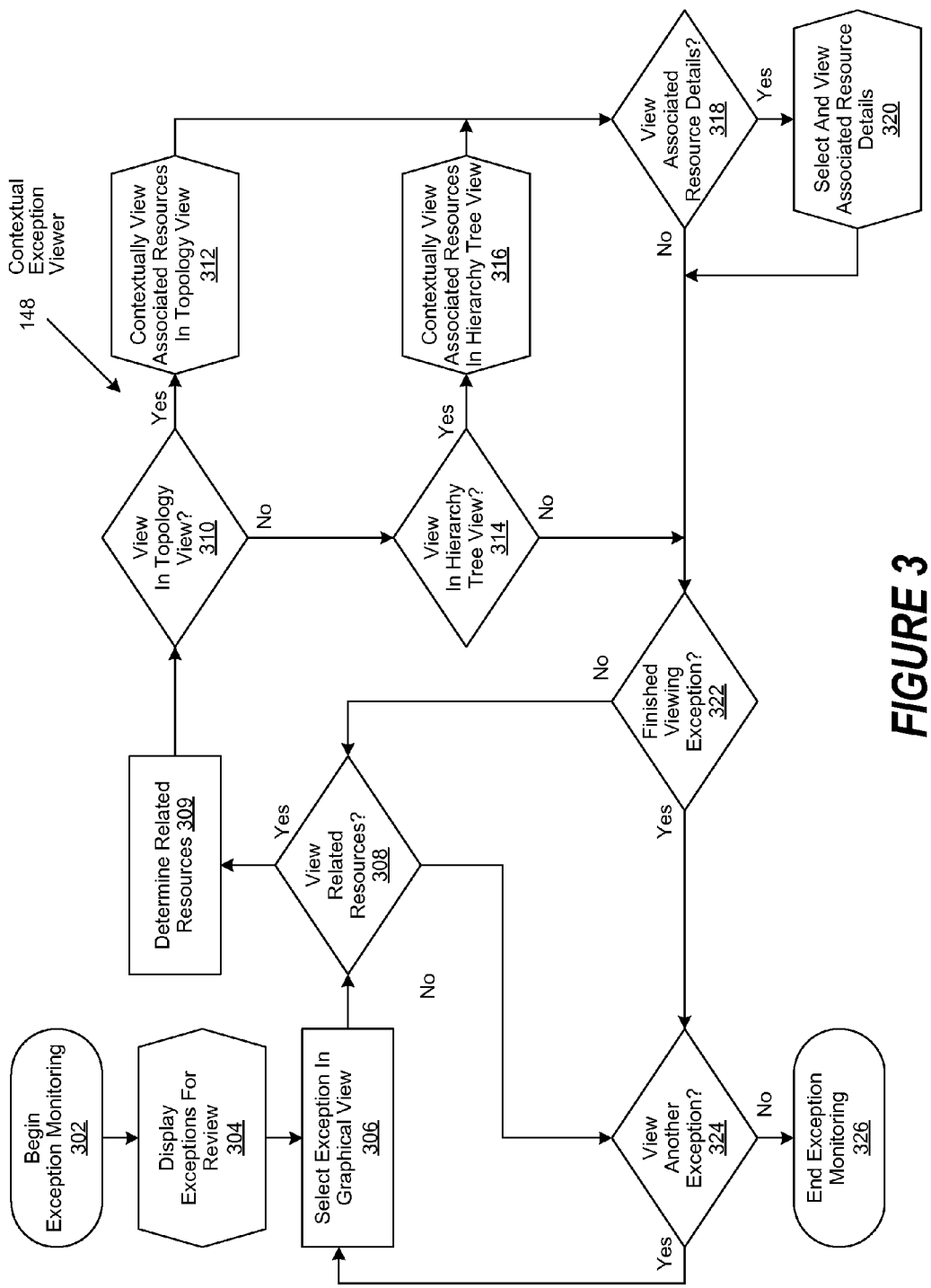
FIG. 3 is a generalized flow chart of the operation of a contextual exception viewer.

With reference now to the figures, and in particular to FIG. 3, there is depicted a method, apparatus and computer-usable medium for the graphical presentation of the contextual relationship between a reported exception and its related resources and/or contributing factors.

Figure 1:
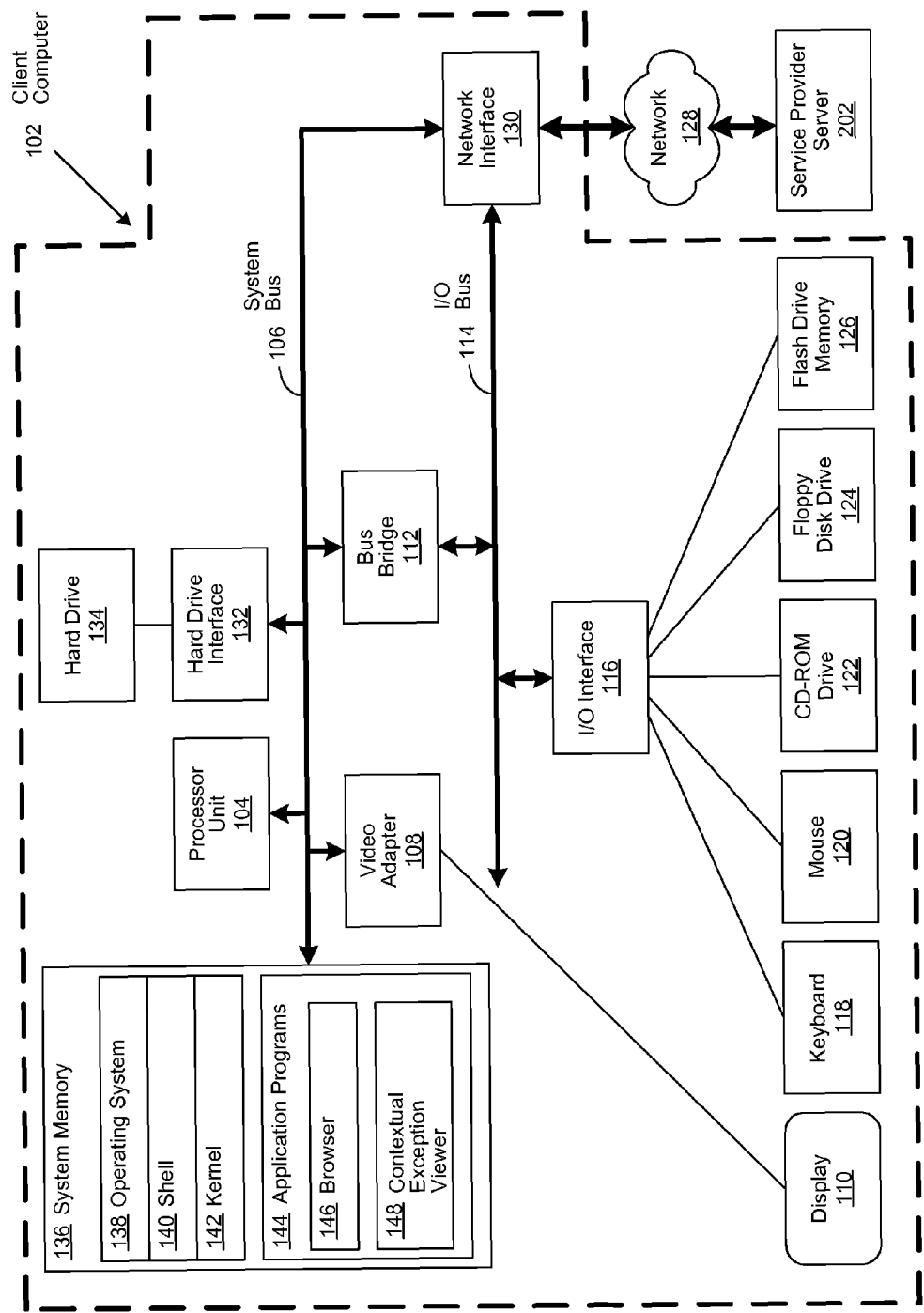
FIG. 1 depicts an exemplary client computer in which the present invention may be implemented.

With reference now to FIG. 1, there is depicted a block diagram of an exemplary client computer 102, in which the present invention may be utilized. Client computer 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 416 may be any known to those skilled in the art of computer architecture, including but not limited to Universal Serial Bus (USB) ports.

Client computer 102 is able to communicate with a service provider server 202 via a network 128 using a network interface 130, which is coupled to system bus 106.

Network 128 may be an external network such as the Internet, or an internal network such as an Ethernet or a Virtual Private Network (VPN). Using network 128, client computer 102 is able to use the present invention to access service provider server 202.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes client computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 202.

Application programs 144 in client computer 102's system memory also include a contextual exception viewer 148. Contextual exception viewer 148 includes code for implementing the processes described in FIG. 3. In one embodiment, client computer 102 is able to download contextual exception viewer 148 from service provider server 202.

The hardware elements depicted in client computer 102 are not intended to be exhaustive, but rather are representative to highlight essential components required by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
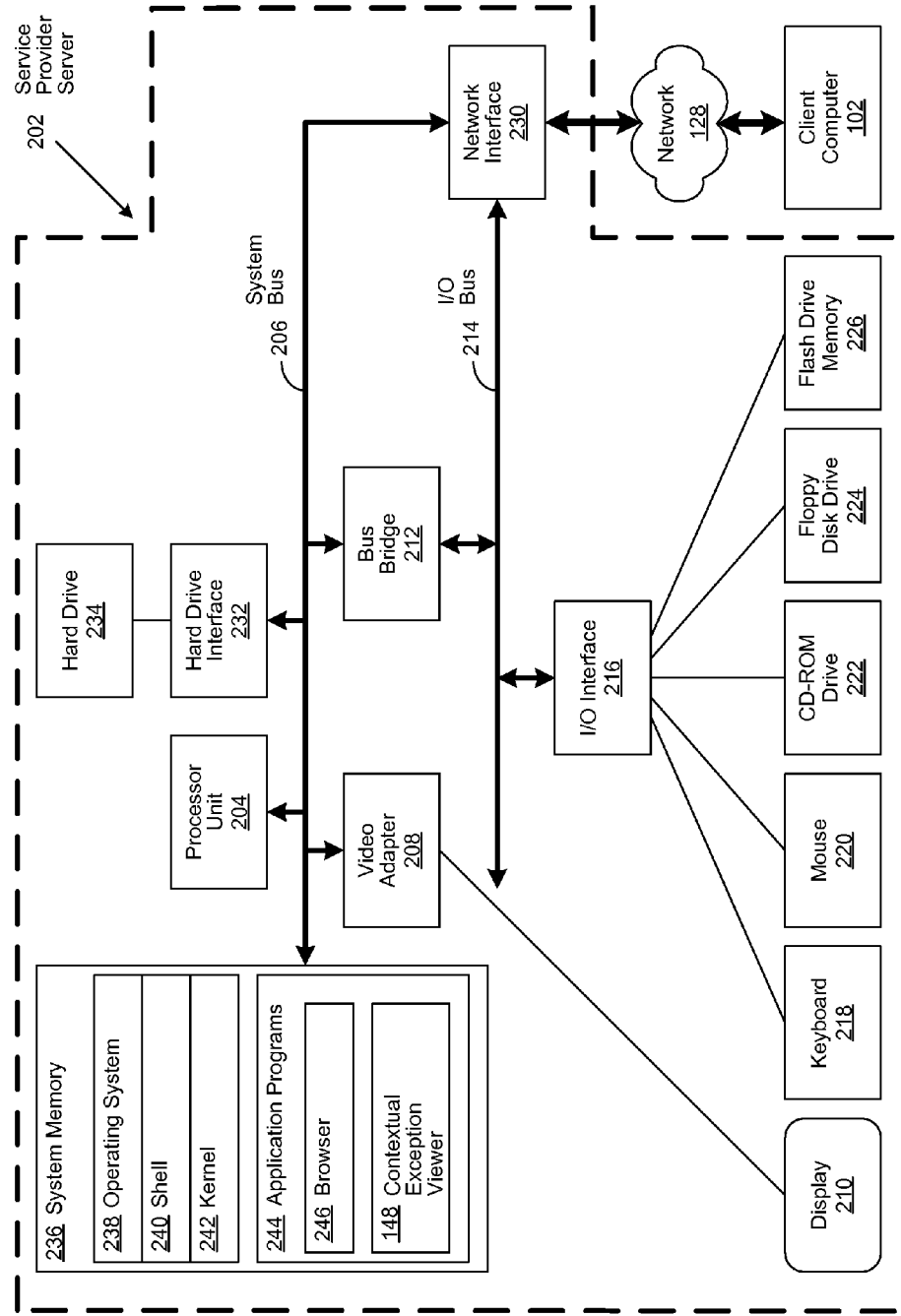
FIG. 2 illustrates an exemplary server from which software for executing the present invention may be deployed and/or implemented for the benefit of a user of the client computer shown in FIG. 1.

As noted above, contextual exception viewer 148 can be downloaded to client computer 202 from service provider server 202, shown in exemplary form in FIG. 2. Service provider server 202 includes a processor unit 204 that is coupled to a system bus 206. A video adapter 208 is also coupled to system bus 206. Video adapter 208 drives/supports a display 210. System bus 206 is coupled via a bus bridge 212 to an Input/Output (I/O) bus 214. An I/O interface 216 is coupled to I/O bus 214. I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

Service provider server 202 is able to communicate with client computer 102 via network 128 using a network interface 230, which is coupled to system bus 206. Access to network 128 allows service provider server 202 to execute and/or download contextual exception viewer 148 to client computer 102.

System bus 206 is also coupled to a hard drive interface 232, which interfaces with a hard drive 234. In a preferred embodiment, hard drive 234 populates a system memory 236, which is also coupled to system bus 206. Data that populates system memory 236 includes service provider server 202's operating system 238, which includes a shell 240 and a kernel 242. Shell 240 is incorporated in a higher level operating system layer and utilized for providing transparent user access to resources such as application programs 244, which include a browser 246, and a copy of contextual exception viewer 148 described above, which can be deployed to client computer 102.

The hardware elements depicted in service provider server 202 are not intended to be exhaustive, but rather are representative to highlight essential components required by the present invention. For instance, service provider server 202 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 202 performs all of the functions associated with the present invention (including execution of contextual exception viewer 148), thus freeing client computer 102 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

FIG. 3 is a generalized flow chart of the operation of a contextual exception viewer 148. In Step 302, exception monitoring of an information processing environment begins, with exceptions graphically displayed for review in Step 304 as they are identified and reported. In Step 306, an exception is selected from the graphical display through user gestures, and a user decides in Step 308 to view its contextually-related resources and/or contributing factors. In Step 309, the exception monitoring continues by determining which resources are related to the selected exception. In the simplest case the data model of exceptions, resources, and inter-resource relationships are maintained in a database. This database is then examined in Step 309 to perform tasks such as traversing relationships to identify related resources, filtering the resultant resource list by attributes such as status, location or priority, etc. Then the user decides in Step 310 if its contextually-related resources are to be viewed in a topology-oriented view.

If the user decides in Step 308 to not view an exception's contextually-related resources, and the user decides in Step 324 to view another exception, then the process is repeated, beginning with Step 306. If the user decides in Step 324 to not view another exception, then exception monitoring is ended in Step 326. If the user decides in Step 310 to contextually view its related resources in a topology-oriented view, then they are so viewed in Step 312, and if the user decides in Step 318 to view contextually-related resource details, then resources are selected by user gesture through the graphical display and the details are viewed in Step 320. If the user decides in Step 310 to not view an exception's contextually-related resources in a topology-oriented view, then the user decides in Step 314 if its contextually-related resources are to be viewed in a hierarchy tree view.

If the user decides in Step 314 to view its contextually-related resources in a hierarchy tree view, then they are so viewed in Step 316, and if the user decides in Step 318 to view contextually-related resource details, then resources are selected by user gesture through the graphical display and the details are viewed in Step 320. Once details of contextually-associated resources have been viewed in Step 320, or if the user decides in Step 314 to not view an exception's contextually-related resources in a hierarchy tree view, then the user decides in Step 322 if contextual-viewing of the exception is complete. If contextual-viewing of the exception is not complete, then the process is repeated, beginning with Step 308. If contextual viewing of the exception is complete, then if the user decides in Step 324 if contextual resources and/or contributing factors of another exception are to be viewed. If the user decides in Step 324 to view another exception, then the process is repeated, beginning with Step 306. If the user decides in Step 324 to not view another exception, then exception monitoring is ended in Step 326.

Figure 4:
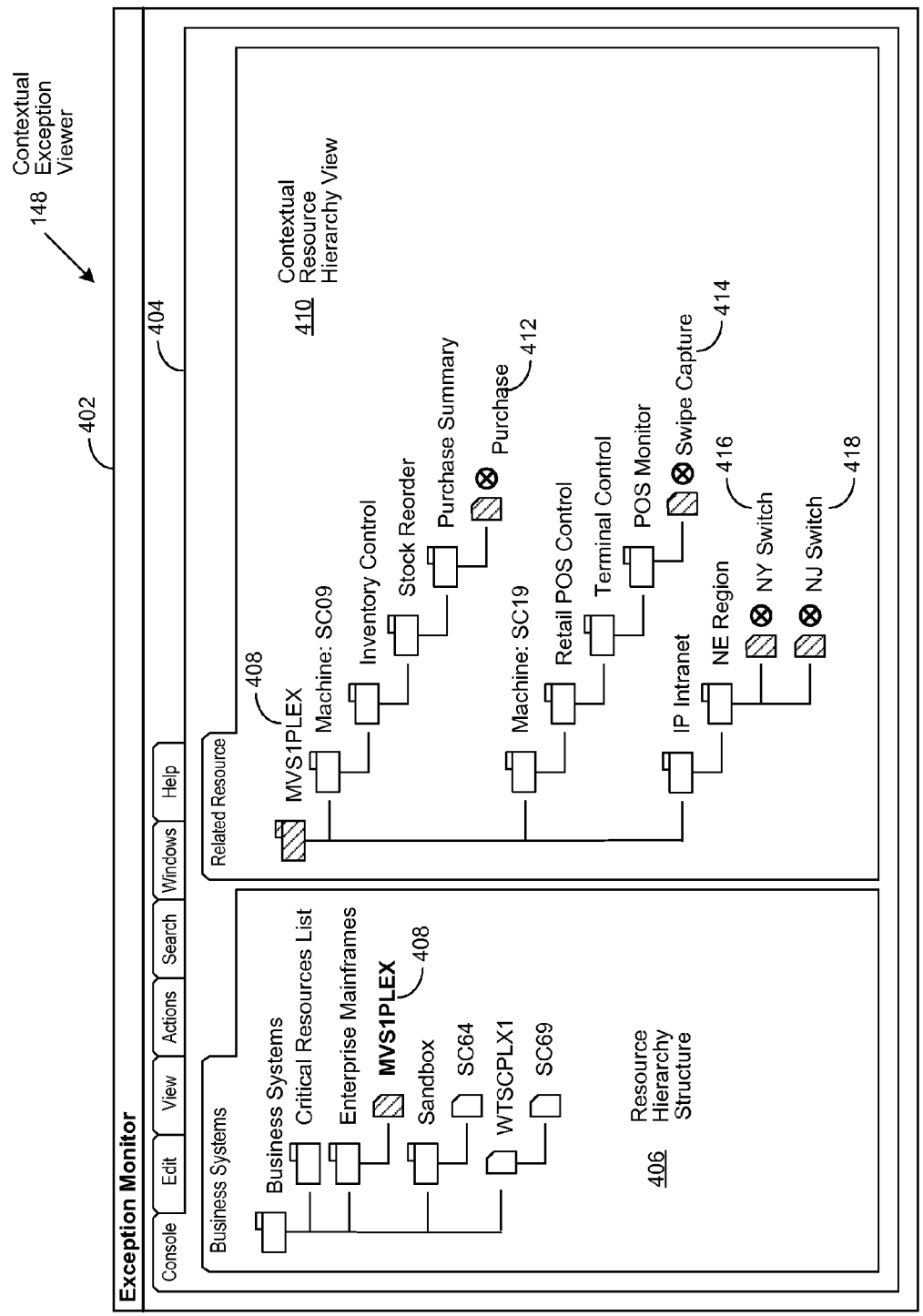
FIG. 4 is a generalized illustration of a contextual exception viewer for viewing an exception's contextually-related resources in a hierarchy tree view.

FIG. 4 is a generalized illustration of contextual exception viewer 148 for viewing an exception's contextually-related resources in a hierarchy tree view. In an embodiment of the invention, contextually related processes and resources are graphically depicted in one or more hierarchy trees, with the operational health or condition of each resource indicated through the use of color (e.g., red for critical, orange for degrading, yellow for marginal, green for operational, etc.). In this embodiment, graphical user interface (GUI) 402 comprises hierarchical view windows 404 comprising resource hierarchy structure window 406 and contextual resource hierarchy view window 410. By selecting exception 408 through user gestures in resource hierarchy structure window 406, resources 412, 414, 416, 418 that are contextually related to exception 408 are presented in contextual resource hierarchy view window 410.

Figure 5:
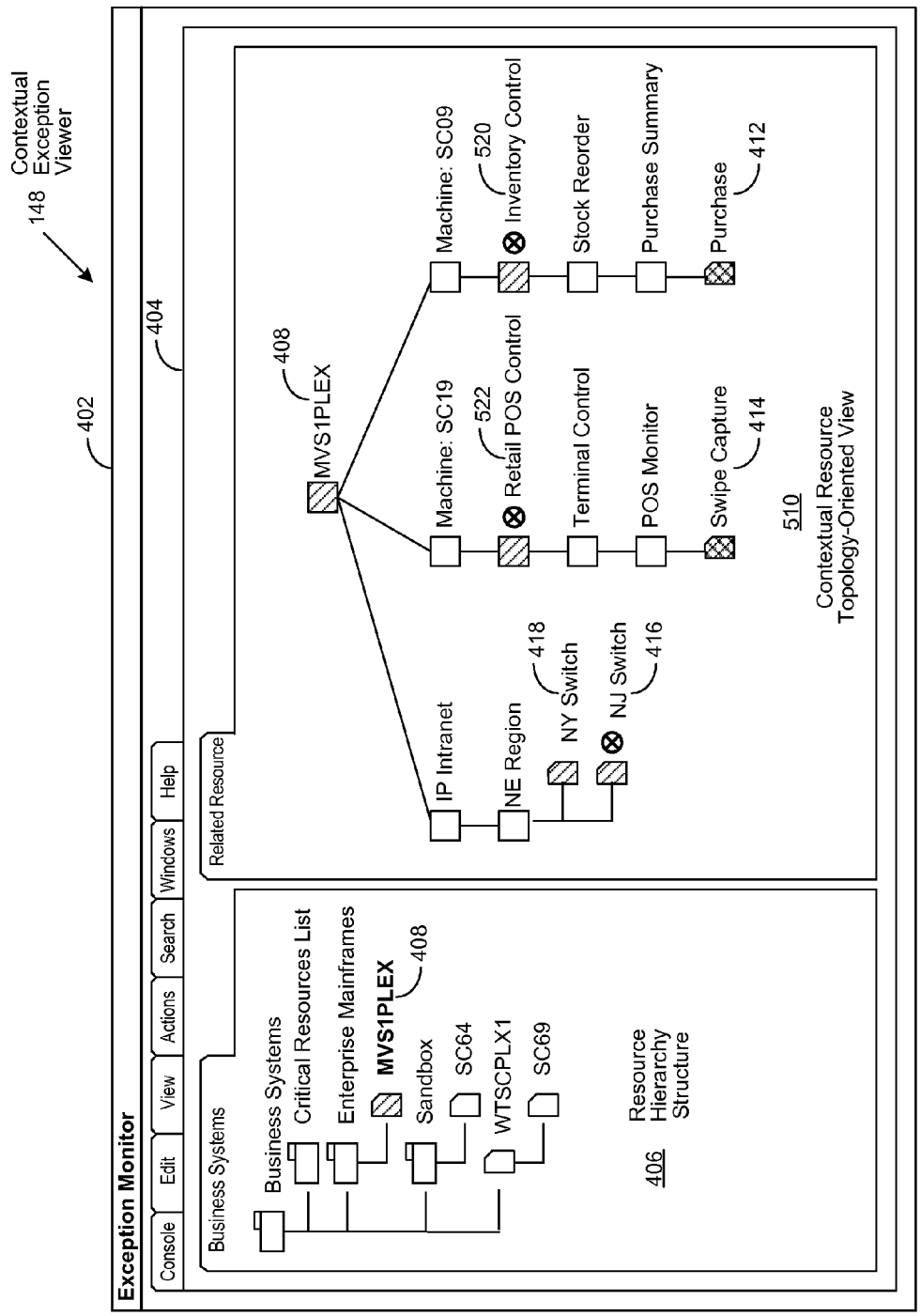
FIG. 5 is a generalized illustration of a contextual exception viewer for viewing an exception's contextually-related resources in a topology-oriented view.

FIG. 5 is a generalized illustration of contextual exception viewer 148 for viewing an exception's contextually-related resources in a topology-oriented view. In an embodiment of the invention, contextually related processes and resources are graphically depicted in one or more hierarchy trees, with the operational health or condition of each resource indicated through the use of color (e.g., red for critical, orange for degrading, yellow for marginal, green for operational, etc.). In this embodiment of the invention, graphical user interface (GUI) 402 comprises hierarchical view windows 404 comprising resource hierarchy structure window 406 and contextual resource view window 510. By selecting exception 408 through user gestures in resource hierarchy structure window 406, resources 412, 414, 416, 418, 520 and 522 that are contextually related to exception 408 are presented in contextual resource hierarchy view window 510. In contextual resource hierarchy window 510, colors and/or icons indicate that inventory control resource520 and retail POS control resource 522 are in a failed state, are related to each other, and both are coupled to New Jersey switch resource 416, which is also in a failed state. The contextual view indicates the failures have a commonality (e.g., NJ switch 416) that has likely caused the other resources to enter a failed state. The contextual view likewise indicates through the use of color that purchase transaction resource 412 and swipe capture resource 414 are similarly related and also in a failed state. Purchase transaction resource 412 and swipe capture resource 414 are subordinate to inventory control resource520 and retail POS control resource 522, further substantiating that the failure of New Jersey switch 416 is the cause of the other related resources entering a failed state.

Figure 6:
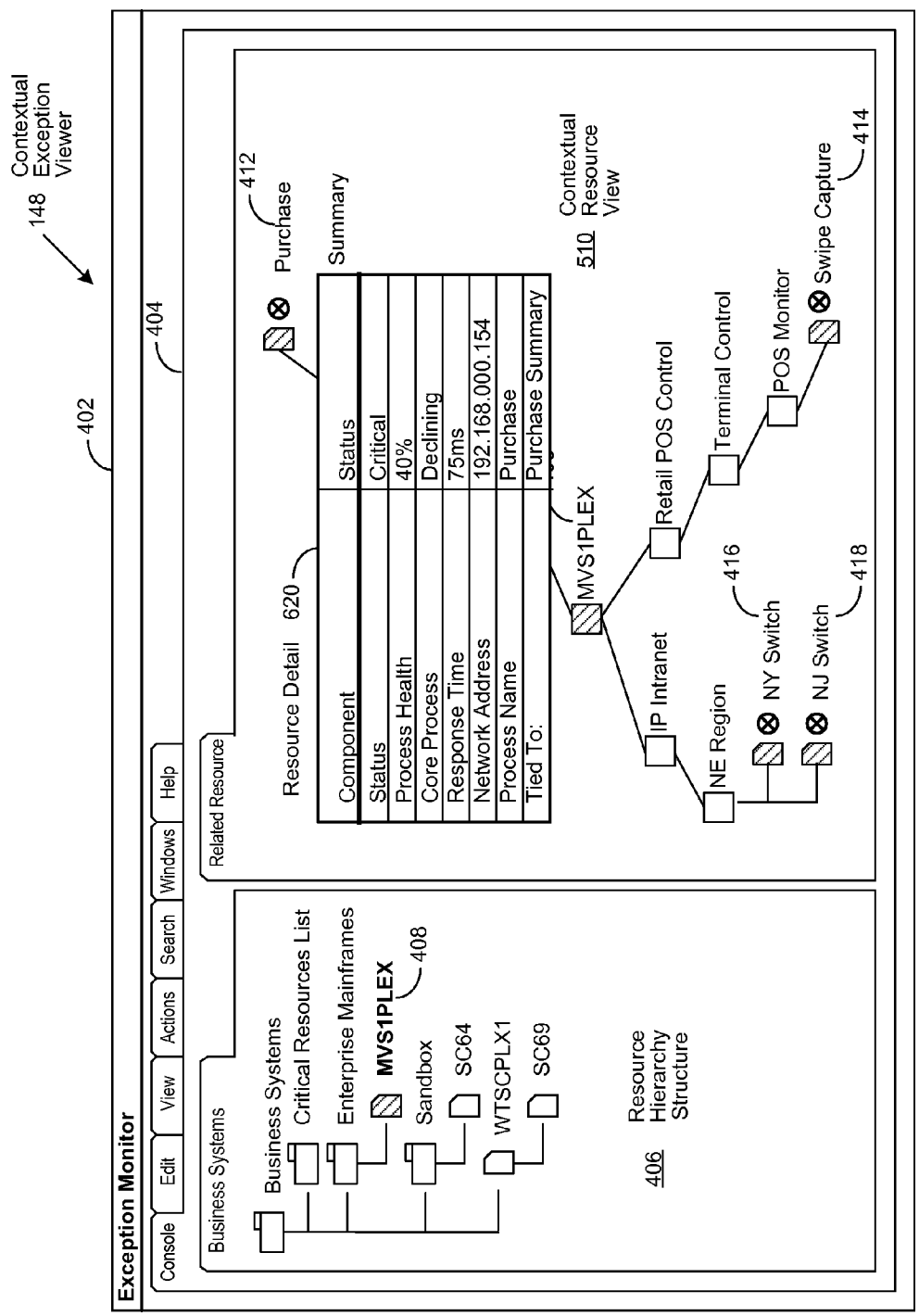
FIG. 6 is a generalized illustration of a contextual exception viewer for viewing detail of an exception's contextually-related resources in a topology-oriented view.

FIG. 6 is a generalized illustration of contextual exception viewer 148 for viewing detail of an exception's contextually-related resources in a topology-oriented view. In an embodiment of the invention, contextually related processes and resources are graphically depicted in one or more hierarchy trees, with the operational health or condition of each resource indicated through the use of color (e.g., red for critical, orange for degrading, yellow for marginal, green for operational, etc.). In this embodiment of the invention, graphical user interface (GUI) 402 comprises hierarchical view windows 404 comprising resource hierarchy structure window 406 and contextual resource topology-oriented view window 510. By selecting exception 408 through user gestures in resource hierarchy structure window 406, resources 412, 414, 416, 418 that are contextually related to exception 408 are presented in contextual resource hierarchy view window 410. Additional resource detail 620 by selecting a resource 412 can be presented through user gestures to gain additional context to an event 408 as presented in resource hierarchy window 406.

Thus, the method described herein, and in particular as shown and described in FIG. 3, can be deployed as a process software from service provider server 202 to client computer 102.

Figure 7A:
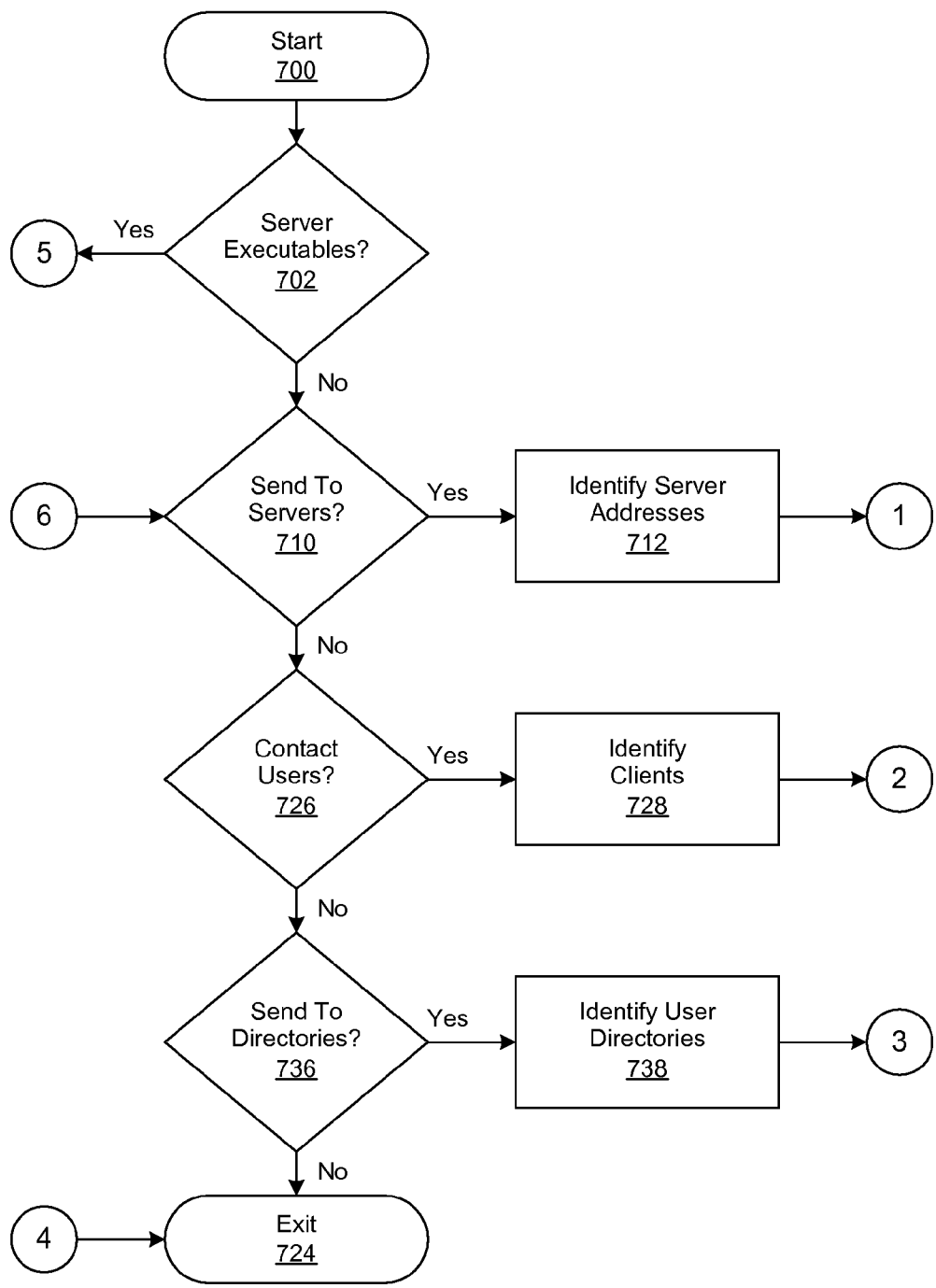
FIGS. 7a-b show a flow-chart of steps taken to deploy software capable of executing the steps shown and described in FIG. 3.
Figure 7B:
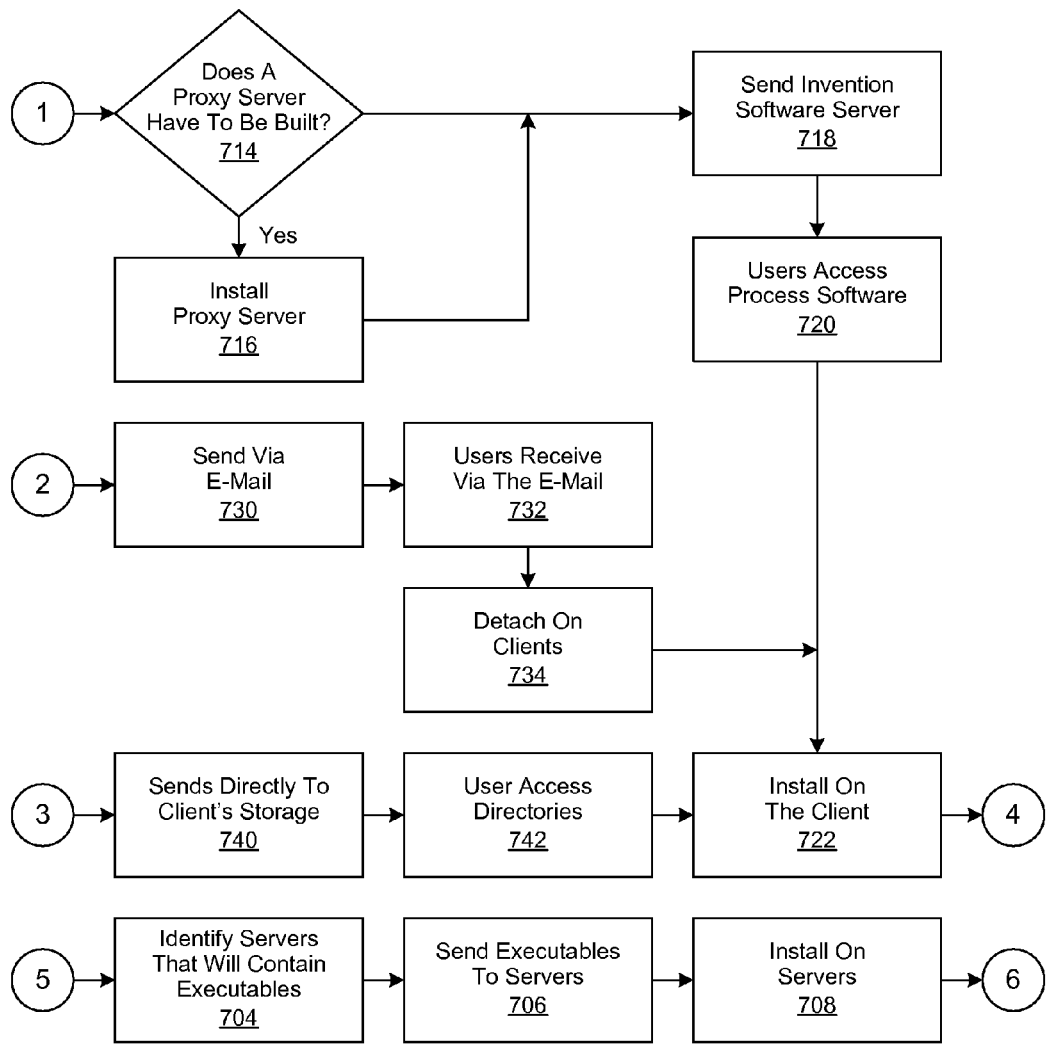

Referring then to FIG. 7, step 700 begins the deployment of the process software. The first thing is to determine if there are any programs that will reside on a server or servers when the process software is executed (query block 702). If this is the case, then the servers that will contain the executables are identified (block 704). The process software for the server or servers is transferred directly to the servers' storage via File Transfer Protocol (FTP) or some other protocol or by copying though the use of a shared file system (block 706). The process software is then installed on the servers (block 708).

Next, a determination is made on whether the process software is to be deployed by having users access the process software on a server or servers (query block 710). If the users are to access the process software on servers, then the server addresses that will store the process software are identified (block 712).

A determination is made if a proxy server is to be built (query block 714) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 716). The process software is sent to the servers either via a protocol such as FTP or it is copied directly from the source files to the server files via file sharing (block 718). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 720). Another embodiment is to have the servers automatically copy the process software to each client and then run the installation program for the process software at each client computer. The user executes the program that installs the process software on his client computer (block 722) then exits the process (terminator block 724).

In query step 726, a determination is made whether the process software is to be deployed by sending the process software to users via e-mail. The set of users where the process software will be deployed are identified together with the addresses of the user client computers (block 728). The process software is sent via e-mail to each of the users' client computers (block 730). The users then receive the e-mail (block 732) and then detach the process software from the e-mail to a directory on their client computers (block 734). The user executes the program that installs the process software on his client computer (block 722) then exits the process (terminator block 724).

Lastly a determination is made on whether to the process software will be sent directly to user directories on their client computers (query block 736). If so, the user directories are identified (block 738). The process software is transferred directly to the user's client computer directory (block 740). This can be done in several ways such as, but not limited to, sharing of the file system directories and then copying from the sender's file system to the recipient user's file system or alternatively using a transfer protocol such as File Transfer Protocol (FTP). The users access the directories on their client file systems in preparation for installing the process software (block 742). The user executes the program that installs the process software on his client computer (block 722) and then exits the process (terminator block 724).

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 8A:
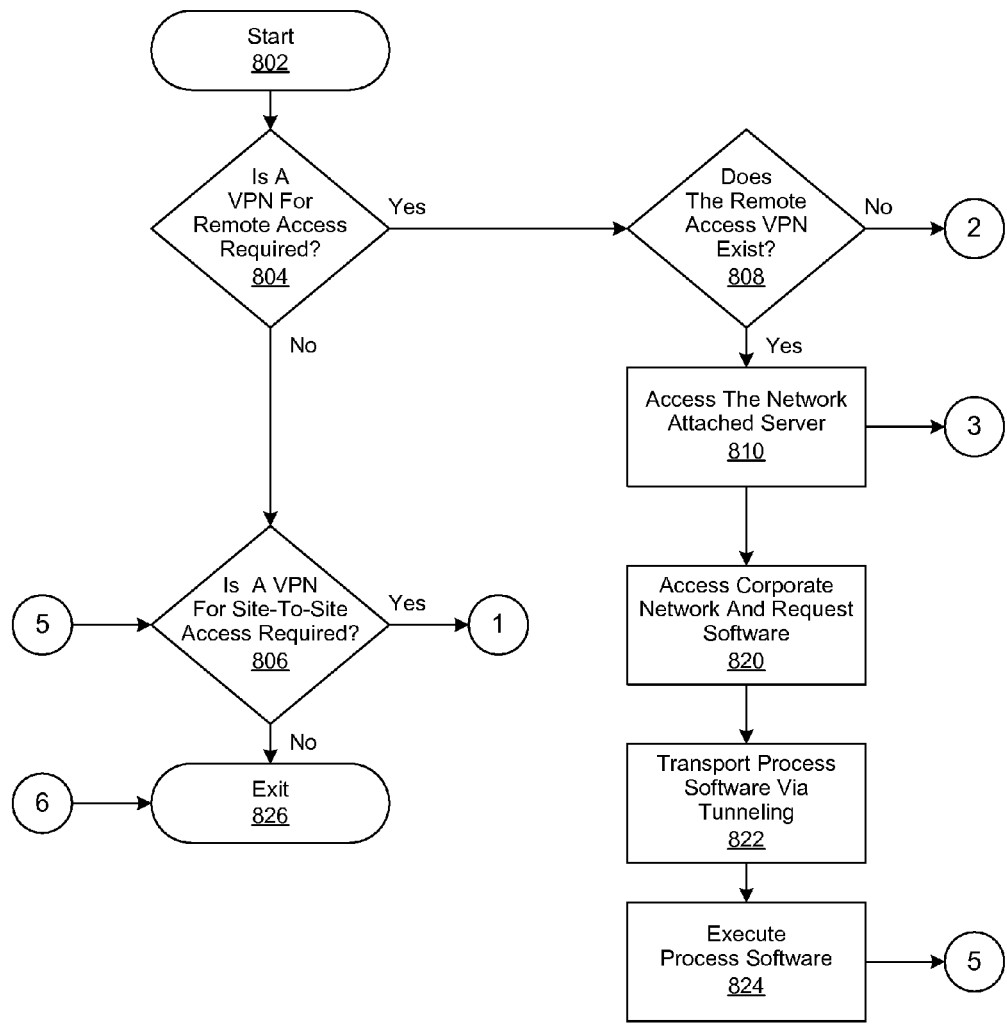

The process for such VPN deployment is described in FIG. 8. Initiator block 802 begins the Virtual Private Network (VPN) process. A determination is made to see if a VPN for remote access is required (query block 804). If it is not required, then proceed to query block 806. If it is required, then determine if the remote access VPN exists (query block 808).

If a VPN does exist, then proceed to block 810. Otherwise identify a third party provider that will provide the secure, encrypted connections between the company's private network and the company's remote users (block 812). The company's remote users are identified (block 814). The third party provider then sets up a network access server (NAS) (block 816) that allows the remote users to dial a toll free number or attach directly via a broadband modem to access, download and install the desktop client software for the remote-access VPN (block 818).

After the remote access VPN has been built or if it been previously installed, the remote users can access the process software by dialing into the NAS or attaching directly via a cable or DSL modem into the NAS (block 810). This allows entry into the corporate network where the process software is accessed (block 820). The process software is transported to the remote user's desktop over the network via tunneling. That is, the process software is divided into packets and each packet including the data and protocol is placed within another packet (block 822). When the process software arrives at the remote user's desktop, it is removed from the packets, reconstituted and then is executed on the remote user's desktop (block 824).

A determination is then made to see if a VPN for site to site access is required (query block 806). If it is not required, then proceed to exit the process (terminator block 826). Otherwise, determine if the site to site VPN exists (query block 828). If it does not exist, then proceed to block 830. Otherwise, install the dedicated equipment required to establish a site to site VPN (block 838). Then build the large scale encryption into the VPN (block 840).

After the site to site VPN has been built or if it had been previously established, the users access the process software via the VPN (block 830). The process software is transported to the site users over the network via tunneling (block 832). That is the process software is divided into packets and each packet including the data and protocol is placed within another packet (block 834). When the process software arrives at the remote user's desktop, it is removed from the packets, reconstituted and is executed on the site user's desktop (block 836). The process then ends at terminator block 826.

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 9A:
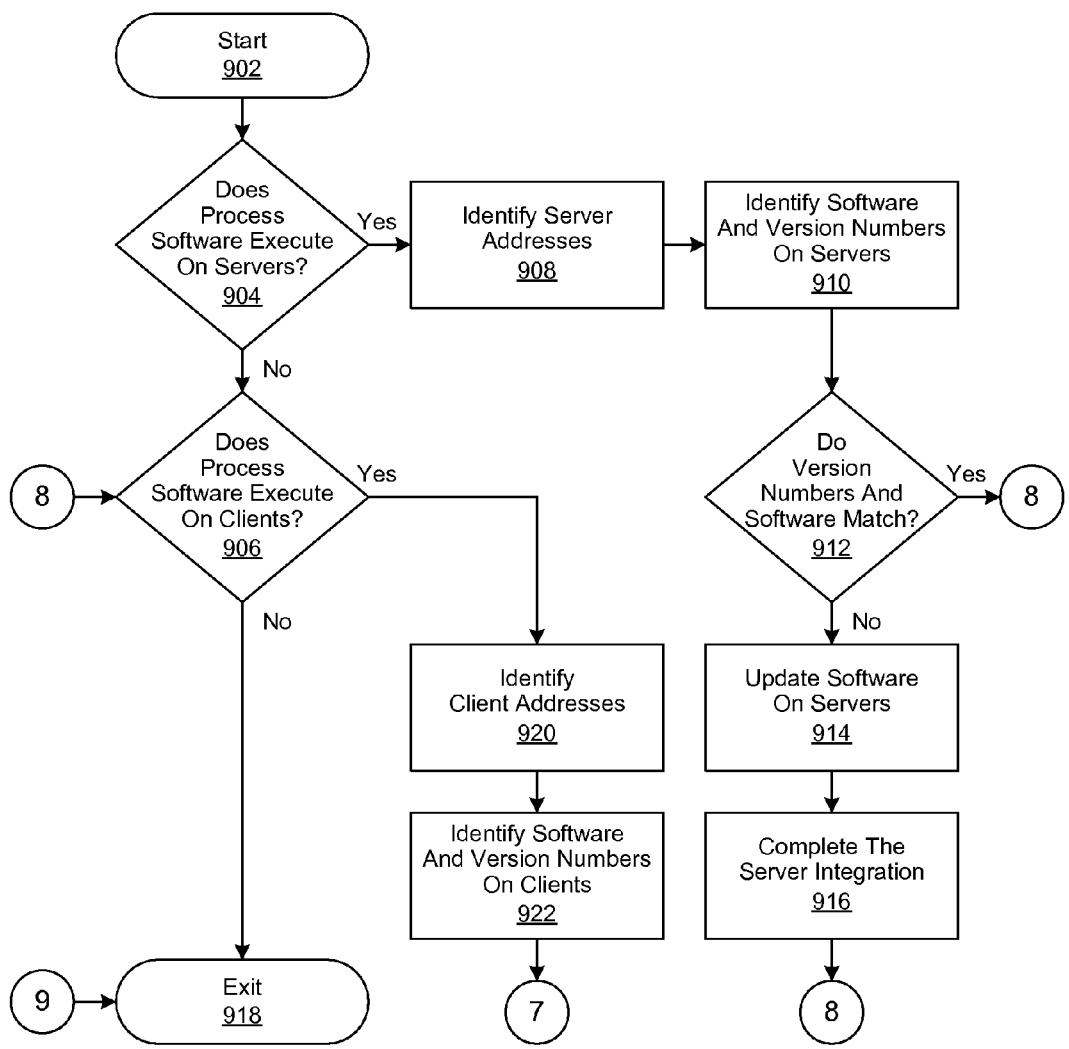
FIGS. 9a-b show a flow-chart showing steps taken to integrate into a computer system software that is capable of executing the steps shown and described in FIG. 3.
Figure 9B:
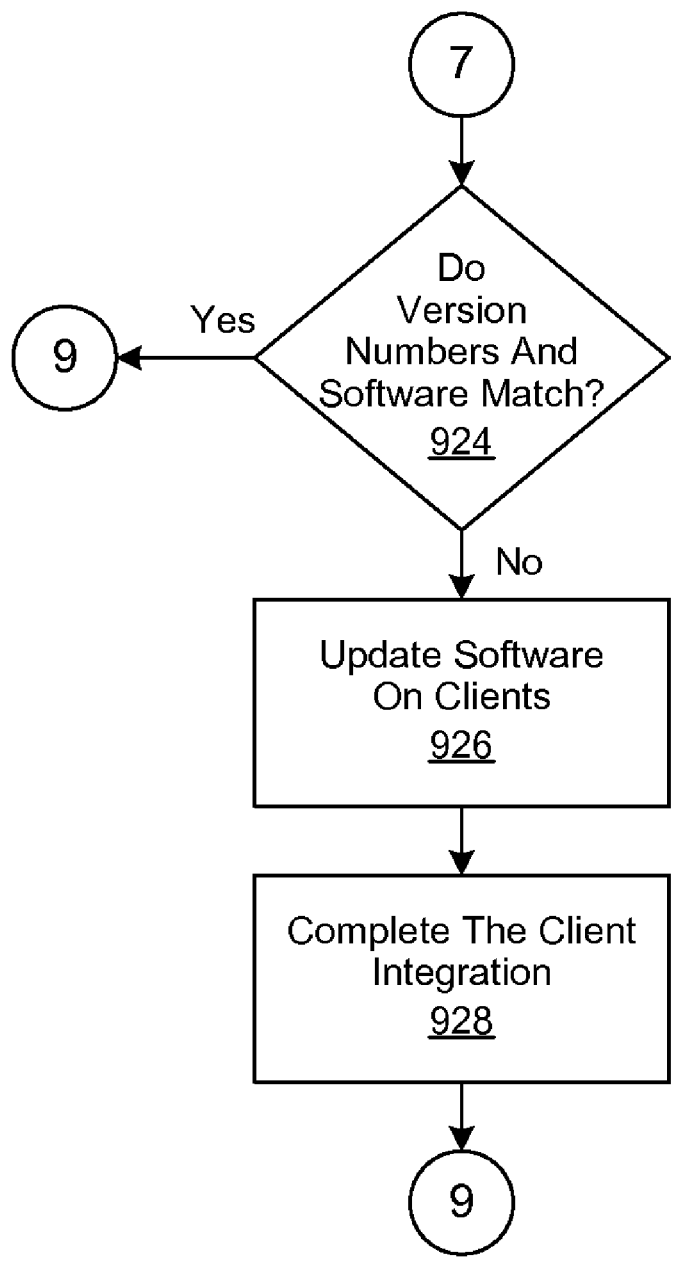

For a high-level description of this process, reference is now made to FIG. 9. Initiator block 902 begins the integration of the process software. The first tiling is to determine if there are any process software programs that will execute on a server or servers (block 904). If this is not the case, then integration proceeds to query block 906. If this is the case, then the server addresses are identified (block 908). The servers are checked to see if they contain software that includes the operating system (OS), applications, and network operating systems (NOS), together with their version numbers, which have been tested with the process software (block 910).

The servers are also checked to determine if there is any missing software that is required by the process software in block 910.

A determination is made if the version numbers match the version numbers of OS, applications and NOS that have been tested with the process software (block 912). If all of the versions match and there is no missing required software the integration continues in query block 906.

If one or more of the version numbers do not match, then the unmatched versions are updated on the server or servers with the correct versions (block 914). Additionally, if there is missing required software, then it is updated on the server or servers in the step shown in block 914. The server integration is completed by installing the process software (block 916).

The step shown in query block 906, which follows either the steps shown in block 904, 912 or 916 determines if there are any programs of the process software that will execute on the clients. If no process software programs execute on the clients the integration proceeds to terminator block 918 and exits. If this not the case, then the client addresses are identified as shown in block 920.

The clients are checked to see if they contain software that includes the operating system (OS), applications, and network operating systems (NOS), together with their version numbers, which have been tested with the process software (block 822). The clients are also checked to determine if there is any missing software that is required by the process software in the step described by block 922.

A determination is made is the version numbers match the version numbers of OS, applications and NOS that have been tested with the process software (query block 924). If all of the versions match and there is no missing required software, then the integration proceeds to terminator block 918 and exits.

If one or more of the version numbers do not match, then the unmatched versions are updated on the clients with the correct versions (block 926). In addition, if there is missing required software then it is updated on the clients (also block 926).

The client integration is completed by installing the process software on the clients (block 928). The integration proceeds to terminator block 918 and exits.

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload.

Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 10A:
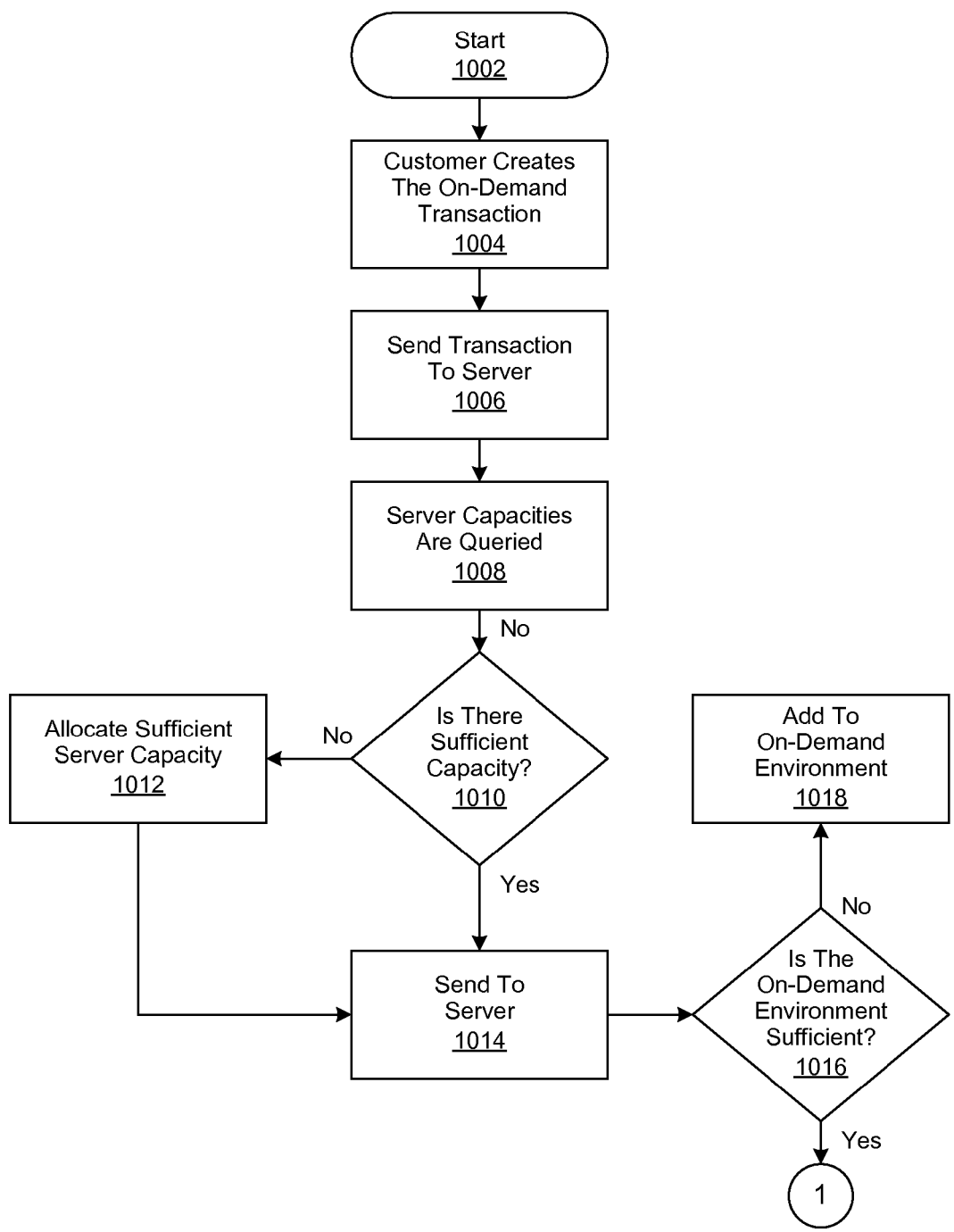
FIGS. 10a-b show a flow-chart showing steps taken to execute the steps shown and described in FIG. 3 using an on-demand service provider.
Figure 10B:
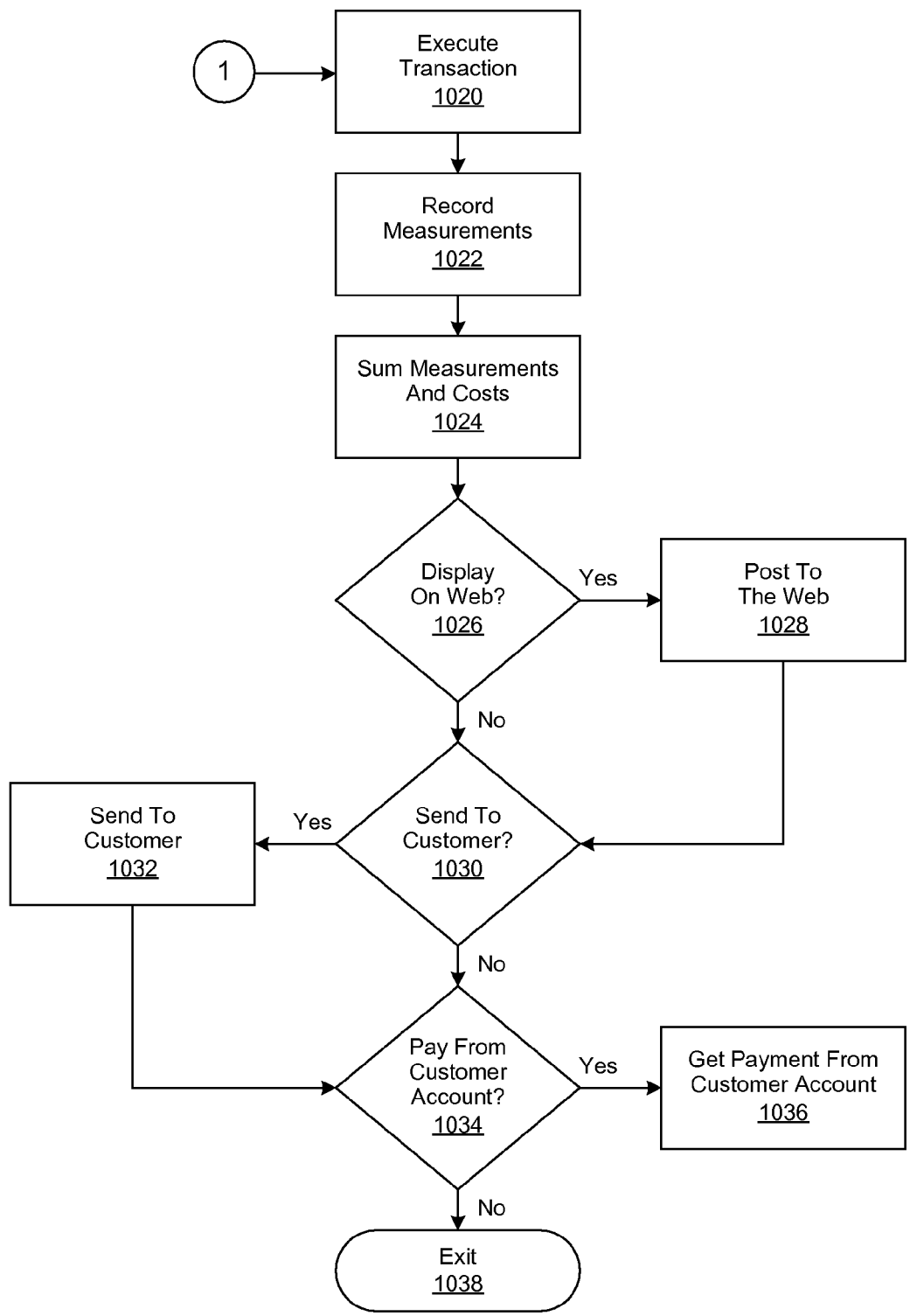

With reference now to FIG. 10, initiator block 1002 begins the On Demand process. A transaction is created than contains the unique customer identification, the requested service type and any service parameters that further, specify the type of service (block 1004). The transaction is then sent to the main server (block 1006). In an On Demand environment the main server can initially be the only server, then as capacity is consumed other servers are added to the On Demand environment.

The server central processing unit (CPU) capacities in the On Demand environment are queried (block 1008). The CPU requirement of the transaction is estimated, then the servers available CPU capacity in the On Demand environment are compared to the transaction CPU requirement to see if there is sufficient CPU available capacity in any server to process the transaction (query block 1010). If there is not sufficient server CPU available capacity, then additional server CPU capacity is allocated to process the transaction (block 1012). If there was already sufficient available CPU capacity then the transaction is sent to a selected server (block 1014).

Before executing the transaction, a check is made of the remaining On Demand environment to determine if the environment has sufficient available capacity for processing the transaction. This environment capacity consists of such things as but not limited to network bandwidth, processor memory, storage etc. (block 1016). If there is not sufficient available capacity, then capacity will be added to the On Demand environment (block 1018). Next the required software to process the transaction is accessed, loaded into memory, then the transaction is executed (block 1020).

The usage measurements are recorded (block 1022). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 1024).

If the customer has requested that the On Demand costs be posted to a web site (query block 1026), then they are posted (block 1028). If the customer has requested that the On Demand costs be sent via e-mail to a customer address (query block 1030), then these costs are sent to the customer (block 1032). If the customer has requested that the On Demand costs be paid directly from a customer account (query block 1034), then payment is received directly from the customer account (block 1036). The On Demand process is then exited at terminator block 1038.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method comprising:
presenting, via a computer system, a contextual relationship between a reported exception and related resources via a graphical presentation, the presenting the contextual relationship including
presenting an exception view to display an abnormally operating resource, the presenting the exception view including presenting an operational state of resources related to the abnormally operating resource and presenting contributing factors to the abnormally operating resources; and wherein
a process is indicated as being in a critical state as a result of a number of contributing sub-processes operating in a marginal state;
determining whether network connectivity problems are causing a properly operating contributing sub-process to be erroneously reported as operating in a marginal state; and,
if network connectivity problems are determined to be present, removing the properly operating contributing sub-process from the result of the number of contributing sub-processes operating in the marginal state.

2. The computer-implementable method of claim 1 wherein:
the operational state of resources related to the abnormally operating resource include properly operating resources, sub-optimally operating resources, abnormally operating resource, and resources operating in a failed state.

3. The computer-implementable method of claim 1 wherein:
the critical state and the marginal state are indicated via different colors.

4. The computer-implementable method of claim 1 wherein:
a contributing peer process that has failed can result in an exception alert for a downstream process.

5. A system comprising:
a processor;
a data bus coupled to the processor; and
a computer-usable medium embodying computer program code, the computer-usable medium being coupled to the data bus, the computer program code comprising instructions executable by the processor and configured for:
presenting a contextual relationship between a reported exception and related resources via a graphical presentation, the instructions for presenting the contextual relationship including instructions executable by the processor and configured for presenting an exception view to display an abnormally operating resource, the presenting the exception view including presenting an operational state of resources related to the abnormally operating resource and presenting contributing factors to the abnormally operating resources; and wherein a process is indicated as being in a critical state as a result of a number of contributing sub-processes operating in a marginal state;

determining whether network connectivity problems are causing a properly operating contributing sub-process to be erroneously reported as operating in a marginal state; and, if network connectivity problems are determined to be present, removing the properly operating contributing sub-process from the result of the number of contributing sub-processes operating in the marginal state.

6. The system of claim 5, wherein:

the operational state of resources related to the abnormally operating resource include properly operating resources, sub-optimally operating resources, abnormally operating resource, and resources operating in a failed state.

7. The system of claim 5 wherein:

the critical state and the marginal state are indicated via different colors.

8. The system of claim 5 wherein:

a contributing peer process that has failed can result in an exception alert for a downstream process.

9. A non-transitory computer-readable medium embodying computer program code, the computer program code comprising computer executable instructions configured for:

presenting a contextual relationship between a reported exception and related resources via a graphical presentation, the instructions for presenting the contextual relationship including computer executable instructions configured for presenting an exception view to display an abnormally operating resource, the presenting the exception view including presenting an operational state of resources related to the abnormally operating resource and presenting contributing factors to the abnormally operating resources; and wherein a process is indicated as being in a critical state as a result of a number of contributing sub-processes operating in a marginal state;

determining whether network connectivity problems are causing a properly operating contributing sub-process to be erroneously reported as operating in a marginal state; and, if network connectivity problems are determined to be present, removing the properly operating contributing sub-process from the result of the number of contributing sub-processes operating in the marginal state.

10. The computer readable medium of claim 9, wherein:

the operational state of resources related to the abnormally operating resource include properly operating resources, sub-optimally operating resources, abnormally operating resource, and resources operating in a failed state.

11. The computer readable medium of claim 9 wherein:

the critical state and the marginal state are indicated via different colors.

12. The computer readable medium of claim 9 wherein:

a contributing peer process that has failed can result in an exception alert for a downstream process.

13. The computer readable medium of claim 9, wherein the computer executable instructions are deployable to a client computer from a server at a remote location.

14. The computer readable medium of claim 9, wherein the computer executable instructions are provided by a service provider to a customer on an on-demand basis.

* * * * *